(12) United States Patent
Leonard et al.

(10) Patent No.: US 9,383,525 B2
(45) Date of Patent: Jul. 5, 2016

(54) HARDENED LOW BACK REFLECTION OPTICAL FIBER PHYSICAL CONTACTS AND CONNECTORS CONTAINING SUCH CONTACTS AND METHOD FOR MAKING THE SAME

(71) Applicant: Optical Cable Corporation, Roanoke, VA (US)

(72) Inventors: Teddy W. Leonard, Wirtz, VA (US); Neil D. Wilkin, Jr., Roanoke, VA (US)

(73) Assignee: OPTICAL CABLE CORPORATION, Roanoke, VA (US)

( * ) Notice: Subject to any disclaimer, the term of this patent is extended or adjusted under 35 U.S.C. 154(b) by 33 days.

(21) Appl. No.: 14/543,062

(22) Filed: Nov. 17, 2014

(65) Prior Publication Data

US 2015/0101172 A1 Apr. 16, 2015

Related U.S. Application Data

(62) Division of application No. 12/904,194, filed on Oct. 14, 2010, now abandoned.

(60) Provisional application No. 61/252,197, filed on Oct. 16, 2009.

(51) Int. Cl.
*G02B 6/38* (2006.01)
*G02B 6/255* (2006.01)

(52) U.S. Cl.
CPC ............ *G02B 6/3849* (2013.01); *G02B 6/2552* (2013.01); *G02B 6/381* (2013.01); *G02B 6/3818* (2013.01); *G02B 6/3846* (2013.01); *G02B 6/3879* (2013.01); *Y10T 29/4998* (2015.01); *Y10T 29/49885* (2015.01); *Y10T 29/49888* (2015.01)

(58) Field of Classification Search
None
See application file for complete search history.

(56) References Cited

U.S. PATENT DOCUMENTS

| | | | |
|---|---|---|---|
| 6,067,396 A | 5/2000 | Heitmann | |
| 6,141,475 A * | 10/2000 | Lawrence | H01S 3/063 372/6 |
| 6,413,450 B1 | 7/2002 | Mays, Jr. | |
| 6,438,304 B1 * | 8/2002 | Lawrence | H01S 3/063 372/6 |
| 6,738,544 B2 | 5/2004 | Culbert et al. | |
| 2009/0060427 A1 | 3/2009 | Wouters | |

* cited by examiner

*Primary Examiner* — Tina Wong
(74) *Attorney, Agent, or Firm* — The Van Winkle Law Firm; David M. Carter; William G. Heedy

(57) ABSTRACT

A fiber optic connector for use with a fiber optic network having at least one predetermined operating wavelength is provided. First housing contains at least one optical fiber. The optical fiber has a free end forming a physical contact. The physical contact is coated with a protective film. The optical thickness of the protective film is at least 0.10 of the operating wavelength of the fiber optic network. Preferably, the physical contact is thermally shaped. Also preferably, the optical fiber is attached to a quick connect device forming a termini. The physical contact of the optical fiber can be readily coated with the protective film by placing the termini in a vacuum chamber.

10 Claims, 6 Drawing Sheets

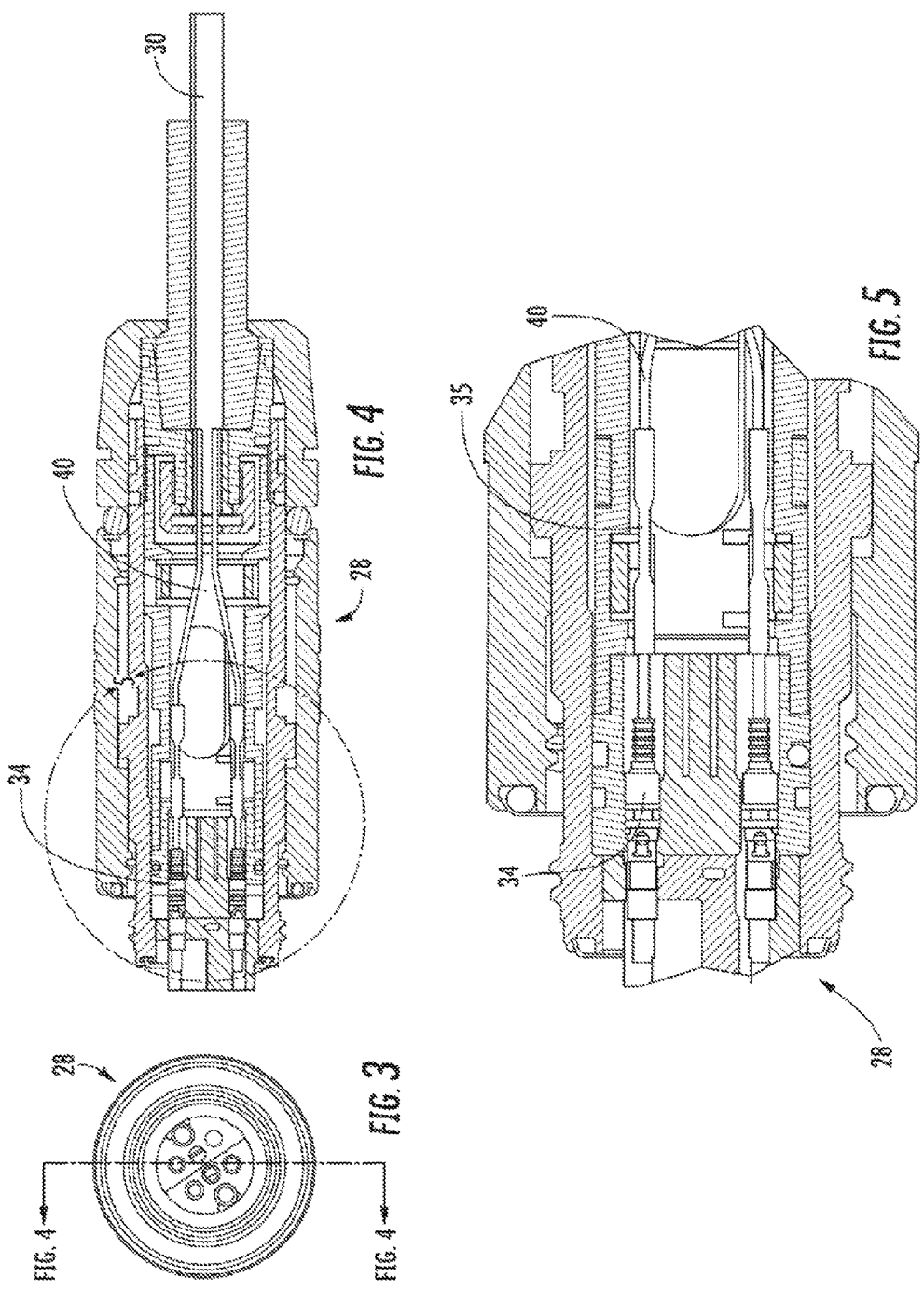

HARDENED LOW BACK REFLECTION OPTICAL FIBER PHYSICAL CONTACTS AND CONNECTORS CONTAINING SUCH CONTACTS AND METHOD FOR MAKING THE SAME

RELATIONSHIP TO PRIOR APPLICATION

This patent application is a Divisional patent application relating to U.S. Non-Provisional application Ser. No. 12/904, 194 filed Oct. 14, 2010, which relates to U.S. Provisional Patent Application Ser. No. 61/252,197 filed Oct. 16, 2009.

BACKGROUND OF THE INVENTION

Physical contact optical fiber connectors are widely used in the communication industry. These connectors have one or more optical fiber physical contacts which are supported by ferrules which also physically align the contacts. These optical fiber physical contacts are often formed by polishing the end face of the optical fiber to a precise radius of curvature. A connector actually includes two connector halves which are intermatable. However, a connector half is often simply referred to as a connector. Thus, the single or multiple contacts are actually received within a connector half. When a corresponding connector half containing fibers and contacts are mated with the other connector half, the optical fiber contacts are brought together at their respective radii of curvature. If the intermated surfaces of the optical contacts are clean and undamaged, the contacts should have reasonably low insertion loss and small back reflection. In addition, it is important to correctly match these intermated optical contacts; for example, the corresponding intermated contacts must be correctly sized and aligned. Ideally, two fibers should be optically and physically identical and held by a connector that aligns the fibers precisely so that the interconnection does not exhibit any influence on the light propagation there through. This ideal situation is impractical because of many reasons, including fiber properties and tolerances in the connector.

The ends of the fibers or contacts have been prepared by several methods, including scoring and breaking the fibers, as well as polishing the ends. Optical fiber connector contacts having very low back reflection become more important at higher data rates. The current practice to obtain low back reflection is to angle polish the physical contact. However, because of this angle, the connector must be keyed to have the proper orientation to mate with its corresponding angle-polished contact.

SUMMARY OF THE INVENTION

In accordance with one form of this invention, there is provided a fiber optic connector for use with a fiber optic network having at least one predetermined operating wavelength. A first housing containing at least one optical fiber is provided. The optical fiber has a free end forming a physical contact. The physical contact is coated with a protective film. The optical thickness of the protective film is at least 0.10 of the operating wavelength of the fiber optic network.

In accordance with another form of this invention, there is provided a fiber optic connector for use with a fiber optic network having at least one predetermined operating wavelength including a first housing. The first housing contains at least one optical fiber. The optical fiber has a free end forming a physical contact. The physical contact is thermally shaped. The thermally shaped terminus is coated with a thin protective film. The optical thickness of the film is less than twice the operating wavelength of the fiber optic network, but is at least 0.10 of the operating wavelength.

In accordance with yet another form of this invention, there is provided a method for manufacturing a fiber optic connector including providing a length of at least one optical fiber. The optical fiber has first and second free ends. The first free end forms a physical contact. A quick connect device is attached to the optical fiber wherein the physical contact projects from one end of the quick connect device and a portion of the optical fiber projects from the other end of the quick connect device thereby forming a termini. A vacuum is applied to the termini. The physical contact is coated with a protective film while the vacuum is applied.

BRIEF DESCRIPTION OF THE DRAWINGS

The subject matter which is regarded as the invention is set forth in the independent claims. The invention, however, may be better understood in reference to the accompanying drawings in which:

FIG. 3 is a front view of the fiber optic connector of FIG. 2.

FIG. 4 is a sectional view of the fiber optic connector of FIG. 3 taken through section line 4-4.

FIG. 5 is a more detailed sectional view of a portion of fiber optic connector of FIG. 4.

DESCRIPTION OF THE PREFERRED EMBODIMENTS

Figure 1:
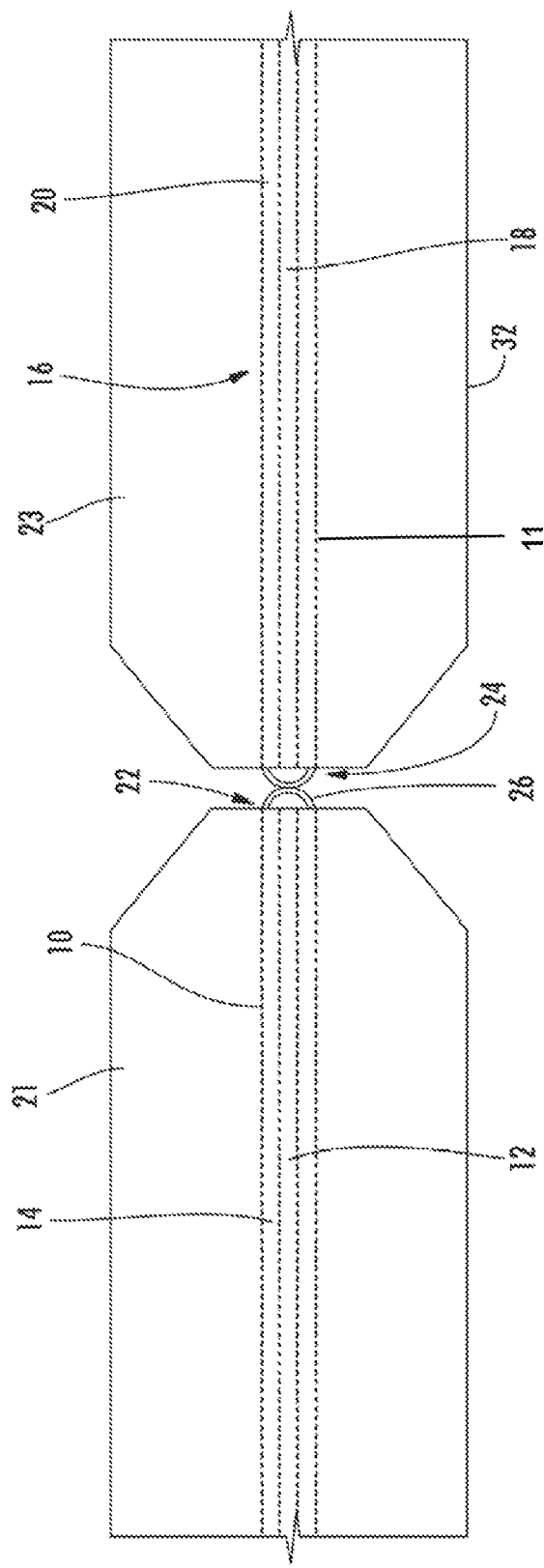
FIG. 1 is a simplified partial side elevational view showing two mating optical fiber physical contacts of the subject invention.

Referring now more particularly to FIG. 1, there is provided optical fiber 10, having core 12 and cladding 14. There is also provided optical fiber 16, having core 18 and cladding 20. Fiber 10 is encapsulated by alignment ferrule 21 and fiber 11 is encapsulated by alignment ferrule 23. As will be discussed below, optical fibers 10 and 16 are mounted in corresponding connector halves which are designed to be intermated.

Optical fiber 10 includes tip 22, which forms a physical contact. Optical fiber 16 includes tip 24, which forms a corresponding physical contact. These contacts 22 and 24 are preferably not angle polished, but preferably have coating thickness adjusted for low reflection and may be thermally shaped for additional reflection reduction.

This thermal shaping may be done by various methods known to those skilled in the art, including the methods taught in U.S. Pat. Nos. 6,413,450 and 6,738,554, both assigned to Megladon Manufacturing Group. The teachings of these two Megladon Patents are hereby incorporated herein by reference.

Each physical contact 22 and 24 is coated with thin film 26, which is made of a hard material, i.e., a material having a Knopp hardness which is greater than the Knopp hardness of optical fibers. The preferred coating material is $Al_2O_3$, also known as corundum. Corundum is a very hard material, and thus resists scoring. Other hard coatings may also be used. Preferably this corundum film is thin enough so that light passing through is substantially unaffected, i.e., insertion losses are low but thick enough to resist scoring, and the optical thickness is adjusted so that reflection is low. For the embodiments in which a single layer of the film is applied, the thickness of film 26 should be at least 0.10 of but less than 1.00 of the operating wavelength of the light within the fibers. For embodiments in which multiple layers of film are applied, the thickness of the film can be as high as 2.00 of the operating wavelength of the light within the fibers.

Figure 2:
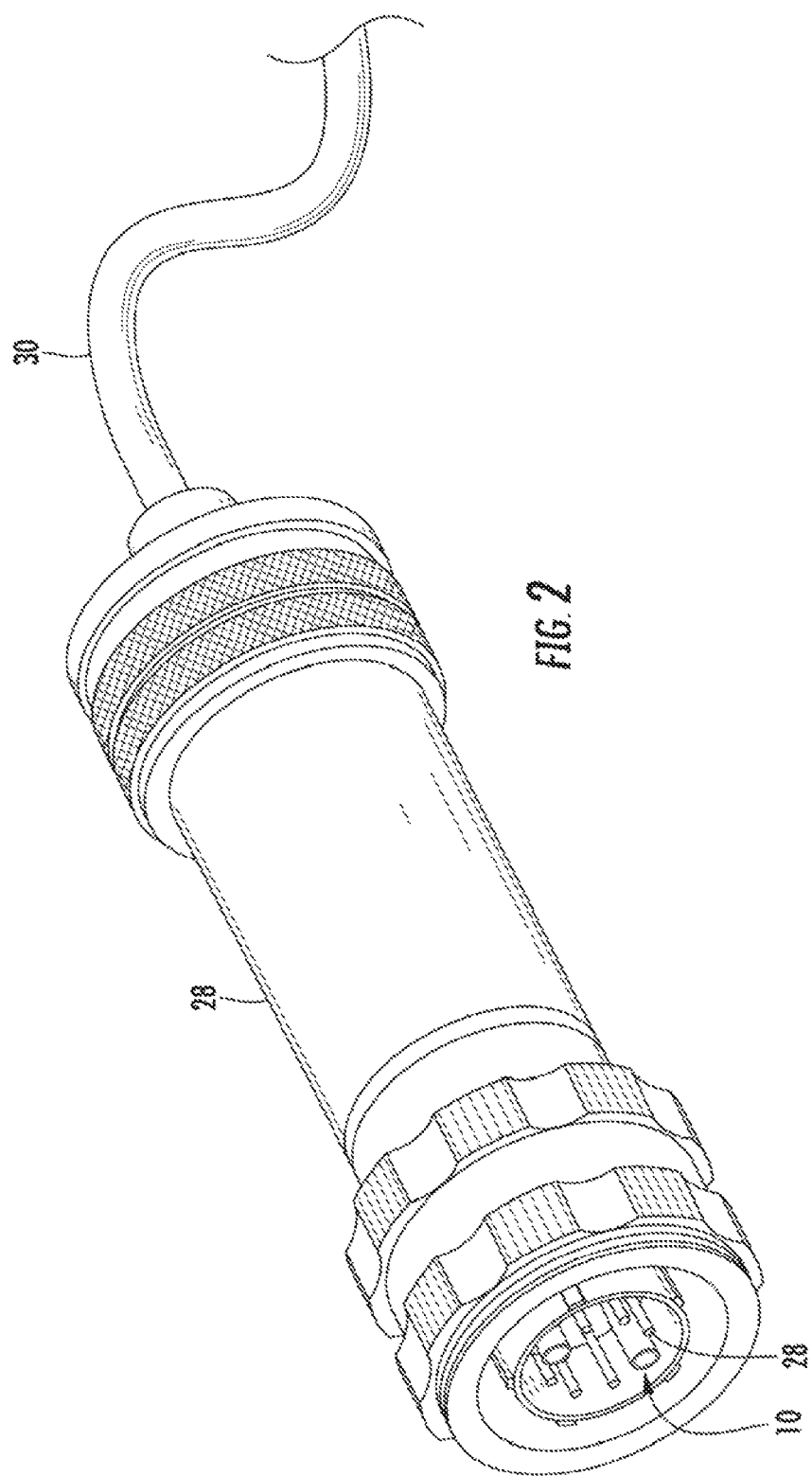
FIG. 2 is a perspective view showing a fiber optic connector and a plurality of the fiber optic contacts of FIG. 1.
Figure 6:
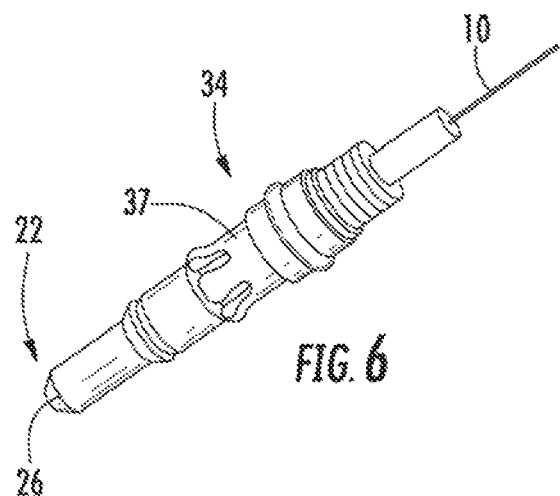
FIG. 6 is a perspective view showing a fiber optic termini with a quick connect device which may be used in connection with the apparatus of the subject invention.

FIG. 2 shows a plurality of optical fibers 10 having physical contacts 22 all of which are mounted in connector body 28. Multi-fiber cable 30 extends from the rear of connector body 28. Preferably the embodiment of FIG. 2 utilizes quick connect optical fiber device as shown in FIG. 6 which are known to those skilled in the art such as the quick connect devices described in U.S. Patent Publication No. US2009/0060427 invented by Wouters. The teachings of the Wouters Patent Publication are hereby incorporated herein by reference.

Figure 7:
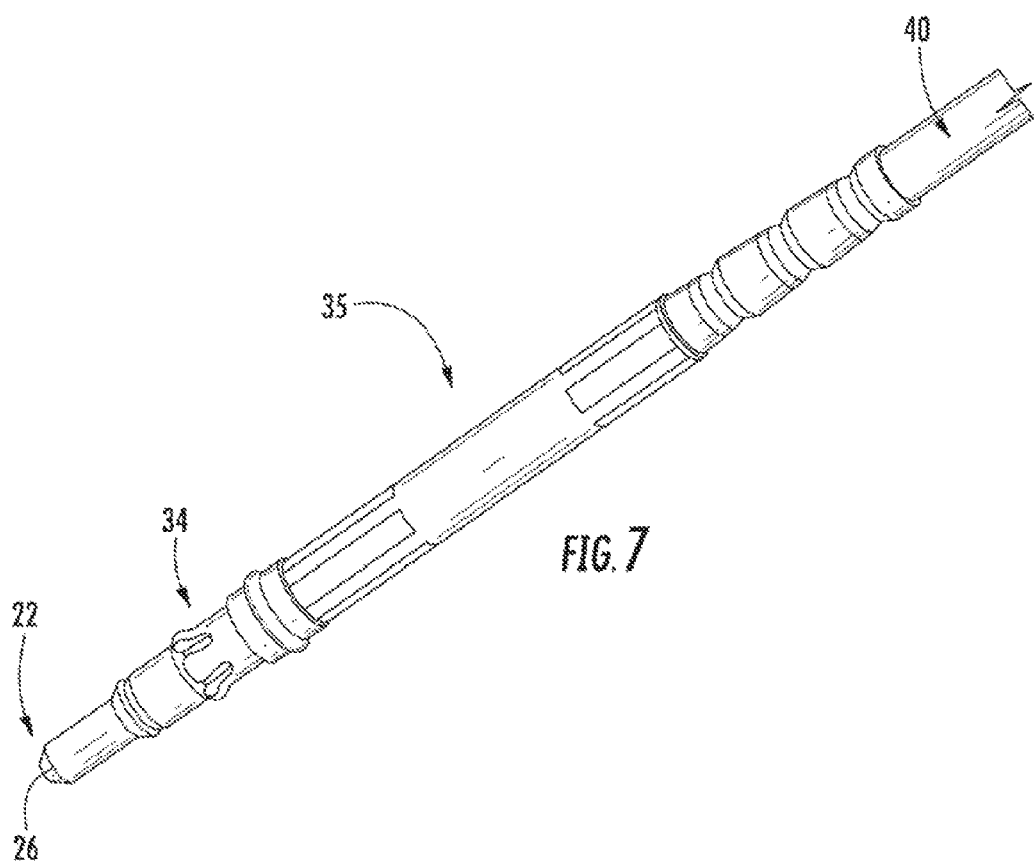
FIG. 7 is a perspective view showing the quick connect device of FIG. 6 having been spliced to fiber optic cable.

FIG. 6 shows termini 34 including quick connect device 37, optical fiber 10 and physical contact 22, physical contact is coated at the tip by corundum film 26. After coating, which is described below, termini 34 is placed in connector body 28, and optical fiber 10 is spliced to a corresponding optical fiber located within cable 30 by a splicing technique known to those skilled in the art. A spliced cable 30/termini 34 is shown in FIG. 7 with the splicing area indicated as item 35. Preferably, contact 22 has been thermally shaped, although the invention is not limited to a thermally shaped contact.

It is preferred that corundum thin film coating 26 is applied to the contacts in a vacuum chamber using a coating process known to those skilled in the art. In embodiments in which the connector is terminated to a reel of optical fiber cable, if quick connect optical fiber termini are not used, the reel, which can be very large depending on the length of the cable, must be placed within the vacuum chamber which can be impractical and expensive. Using termini 34, individual termini may be placed in the vacuum chamber for disposition of the corundum coating application without the cable attached since the termini may be spliced onto the cable after coating of the film has taken place. A single layer vacuum coating run is expensive, and there could be several layers for the embodiment in which the film is used or an anti-reflective coating in addition to providing the hardware discussed above. In addition, each item will need to be rotated inside of the vacuum chamber during the coating process. By using the quick connect optical fiber termini approach, many more contacts can be coated at the same time with a single coating run, and/or a smaller vacuum chamber may be used, resulting in a substantial money savings. If the connector is terminated to a short patch cord(s) the quick-terminated optical fiber termini are not needed since a short patch cord(s) will easily fit into the vacuum chamber.

During the coating process, it is important that only the tip 22 of the optical fiber be coated since the coating materials are very expensive and it would be wasteful to coat other parts of the termini.

Figure 8:
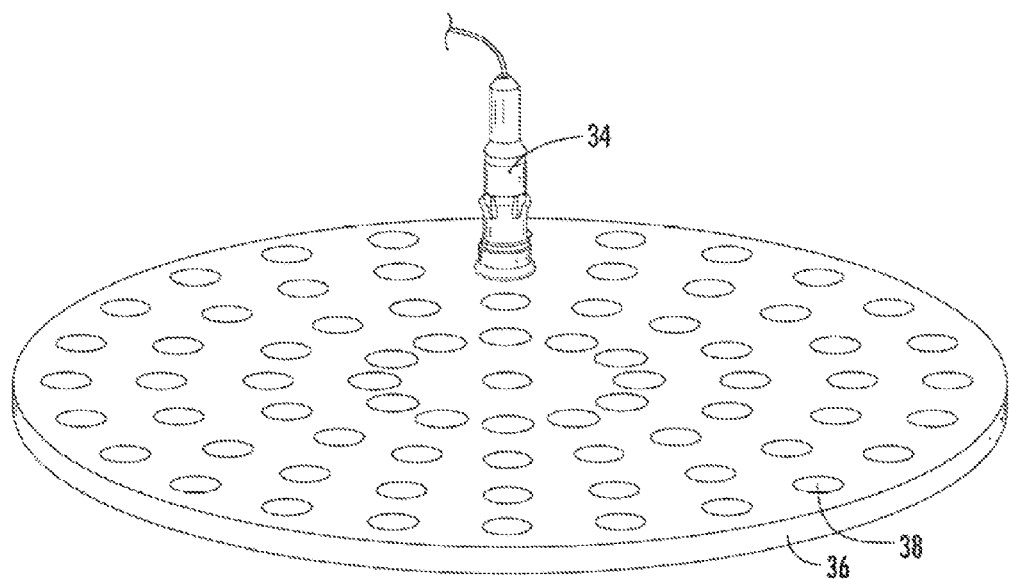
FIG. 8 is a perspective view showing an apparatus used in the manufacture of the optical fiber physical contacts of the subject invention.
Figure 9:
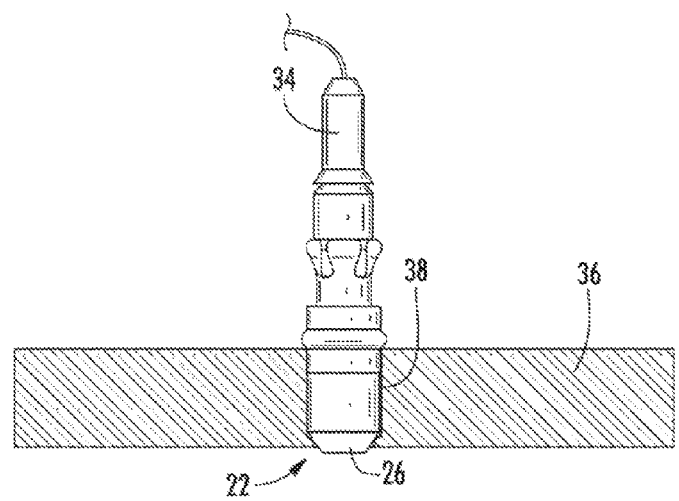
FIG. 9 is a sectional view showing one of the holes in the apparatus of FIG. 8 receiving a termini and a quick connect of FIG. 6.

FIG. 8 illustrates a plate 36 which may be used to segregate the fiber tips 22 from the remainder of the termini during the coating process. Plate 36 includes a plurality of holes 38 which are adapted to receive termini 34 so that the tip 22 projects below the bottom of plate 36 and the remainder of the termini projects above the plate 36 as shown in FIG. 9. For illustration purposes only, a single termini is shown. In reality, it is preferred that each hole in plate 36 receives a termini for the sake of efficiency. Plate 36 is sized with a protective cover on the top of the plate within the vacuum chamber such that the coating occurs in the bottom of the plate, and only the tips 22 are coated. Plate 36 is also rotatable so that the coating is uniform. Once the tips 22 have been coated, termini 34 are removed from the plate and thus from the vacuum chamber and inserted into connector 28 as illustrated in FIGS. 4 and 5. Termini 34 is spliced to optical fiber 40, which is received within cable 30, at splice region 35 using splicing techniques known to those skilled in the art, including techniques described in the Wouters patent publication.

The hard corundum coating can be applied onto several layers of anti-reflective coating to also form a thicker hardened anti-reflective coating, which may in some instances eliminate the need for thermally shaping the contact. In some multi-layer embodiments, the outer layer may be hard corundum and the inner layers may be made of other low or high index of refraction materials having hardness closer to the glass fiber. This anti-reflective coating can be used for one or multiple wavelength bands of operation, including, but not limited to, the bands centered around 850 nm and 1,300 nm or 1,310 nm and 1,550 nm for example. The thickness of the anti-reflective coating depends on the number of layers of the film which are used. For example, the thickness might vary between 0.10 and 2.00 times the operating wavelength. However, where thermally shaping is used, the hardened coating further increases the hardness of the thermally shaped contact.

Multi fiber circular connectors, such as the one shown in FIG. 2, are often used in harsh environments. Since such connectors must be keyed if the contacts are angle-polished, the contact orientations are hard to maintain. The combination of a hardened surface, scratch resistant contact and low back reflection without the need for keyed contact orientation is a great benefit for harsh environment multi-fiber circular connectors.

The physical contact fiber end faces described herein are axially symmetric, rugged and have low back reflection and may be used with single or multi-fiber connectors.

From the foregoing description of various embodiments of the invention, it will be apparent that many modifications may be made therein. It is understood that these embodiments of the invention are exemplifications of the invention only and that the invention is not limited thereto.

The invention claimed is:

1. A method for manufacturing a fiber optic connector comprising:

providing a length of at least one optical fiber;

the optical fiber having first and second free ends; the first free end forming a physical contact;

attaching a quick connect device to the optical fiber wherein the physical contact projects from one end of the quick connect device and a portion of the optical fiber projects from the other end of the quick connect device thereby forming a termini;

applying a vacuum to the termini;

coating the physical contact with a protective film while the vacuum is applied;

providing a plate with protective cover received in a vacuum chamber thereby dividing the vacuum chamber into first and second compartments; inserting the termini into one of the holes so that the physical contact projects into the first compartment; and coating the physical contact in the first compartment; and rotating the plate during coating.

2. The method as set forth in claim 1, further including thermally shaping the physical contact prior to the application of the vacuum.

3. The method as set forth in claim 1, further including isolating the physical contact from the remainder of the optical fiber during coating.

4. The method as set forth in claim 1, further including inserting the termini into a connector housing; and splicing the termini to another optical fiber received in a fiber optic cable.

5. A method for manufacturing a fiber optic connector comprising:

providing a length of at least one optical fiber;

the optical fiber having first and second free ends; the first free end forming a physical contact;

attaching a quick connect device to the optical fiber wherein the physical contact projects from one end of the quick connect device and a portion of the optical fiber projects from the other end of the quick connect device thereby forming a termini;

applying a vacuum to the termini; and coating the physical contact with a protective film prior to the optical fiber being inserted into a ferrule and while the vacuum is applied.

6. The method as set forth in claim 5, further including thermally shaping the physical contact prior to the application of the vacuum.

7. The method as set forth in claim 5, further including isolating the physical contact from the remainder of the optical fiber during coating.

8. The method as set forth in claim 5, further including inserting the termini into a connector housing; and splicing the termini to another optical fiber received in a fiber optic cable.

9. The method as set forth in claim 5, further including providing a plate with protective cover received in a vacuum chamber thereby dividing the vacuum chamber into first and second compartments; inserting the termini into one of the holes so that the physical contact projects into the first compartment; and coating the physical contact in the first compartment.

10. The method as set forth in claim 9, further including rotating the plate during coating.

* * * * *